(12) United States Patent
Belanger et al.

(10) Patent No.: US 7,971,594 B2
(45) Date of Patent: Jul. 5, 2011

(54) PENDULUM-TYPE WHEEL WASHER

(75) Inventors: Michael J. Belanger, Novi, MI (US);
David L. Tognetti, Howell, MI (US);
Marshall L. Hinson, Waterford, MI (US)

(73) Assignee: Belanger, Inc., Northville, MI (US)

( * ) Notice: Subject to any disclaimer, the term of this patent is extended or adjusted under 35 U.S.C. 154(b) by 497 days.

(21) Appl. No.: 12/062,960

(22) Filed: Apr. 4, 2008

(65) Prior Publication Data
US 2009/0250084 A1 Oct. 8, 2009

(51) Int. Cl.
*B08B 3/00* (2006.01)
(52) U.S. Cl. ...................................... 134/123
(58) Field of Classification Search .................. 134/45, 134/123; 15/53.1, 53.2, 53.3, 53.4
See application file for complete search history.

(56) References Cited

U.S. PATENT DOCUMENTS

| | | | | |
|---|---|---|---|---|
| 3,349,783 A | * | 10/1967 | Ellis | 134/45 |
| 4,733,457 A | * | 3/1988 | Tega et al. | 29/709 |
| 4,830,033 A | * | 5/1989 | Hanna | 134/45 |
| 4,971,084 A | | 11/1990 | Smith et al. | |
| 5,320,121 A | | 6/1994 | Alexanian | |
| 7,677,258 B2 | * | 3/2010 | Hodge et al. | 134/45 |
| 2006/0157093 A1 | | 7/2006 | Belanger | |

* cited by examiner

*Primary Examiner* — Michael Barr
*Assistant Examiner* — David Cormier
(74) *Attorney, Agent, or Firm* — Young Basile Hanlon & MacFarlane PC

(57) ABSTRACT

A vehicle wheel washer comprising a pair of spaced-apart, mirror image, depending spray arms with spray heads mounted at the lower ends and directed inwardly toward the wheels of a vehicle which passes between the spray heads. The spray arms are mounted pendulum-type from an overhead pivotal support to move in unison between angular displacement positions thereby to follow the wheels of the vehicle being washed for a considerable linear distance to increase the effectiveness of the wheel cleaning operation. A bi-directional hydraulic actuator controls the positions of the pendulum arms in combination with gravitational force.

6 Claims, 5 Drawing Sheets

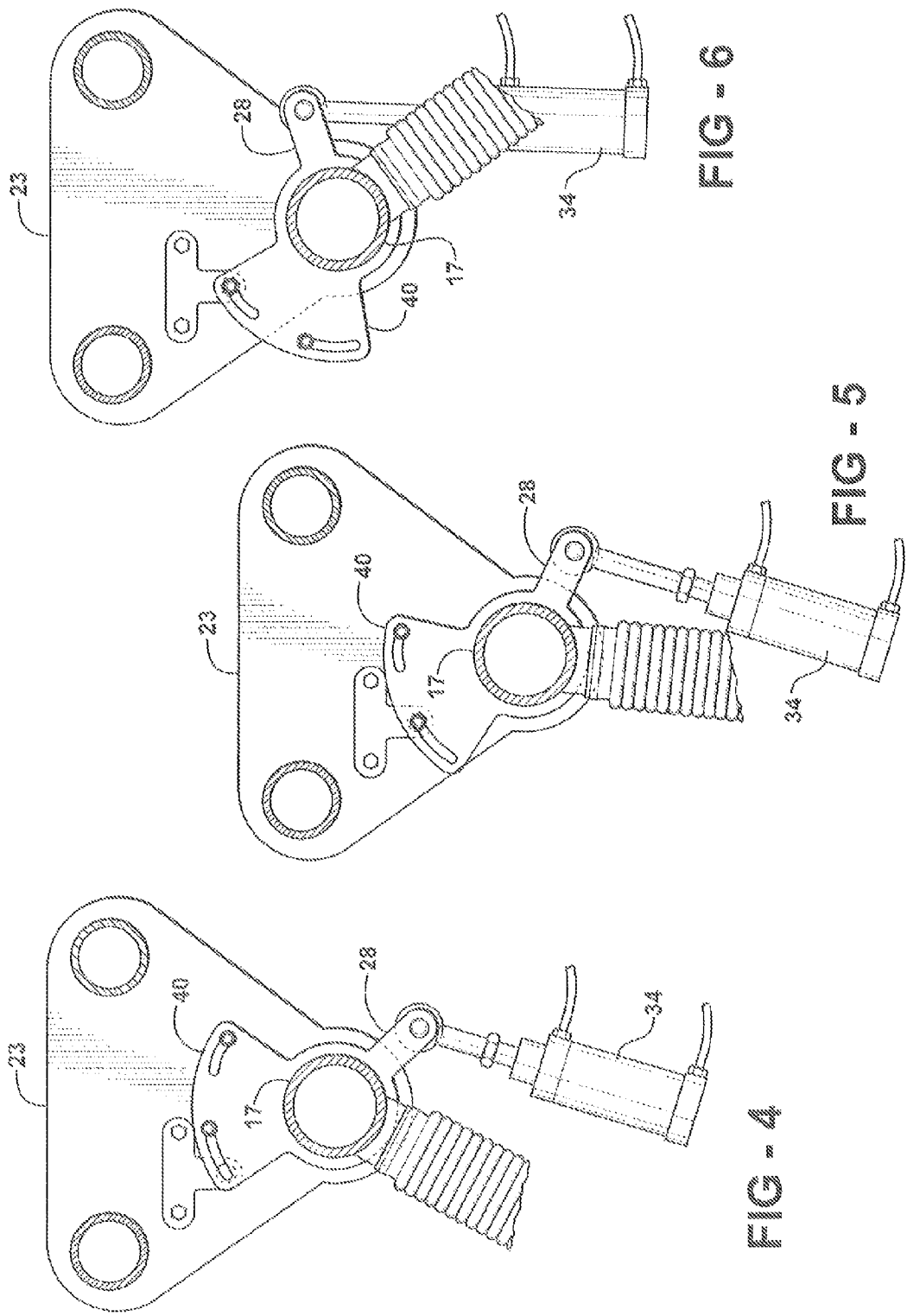

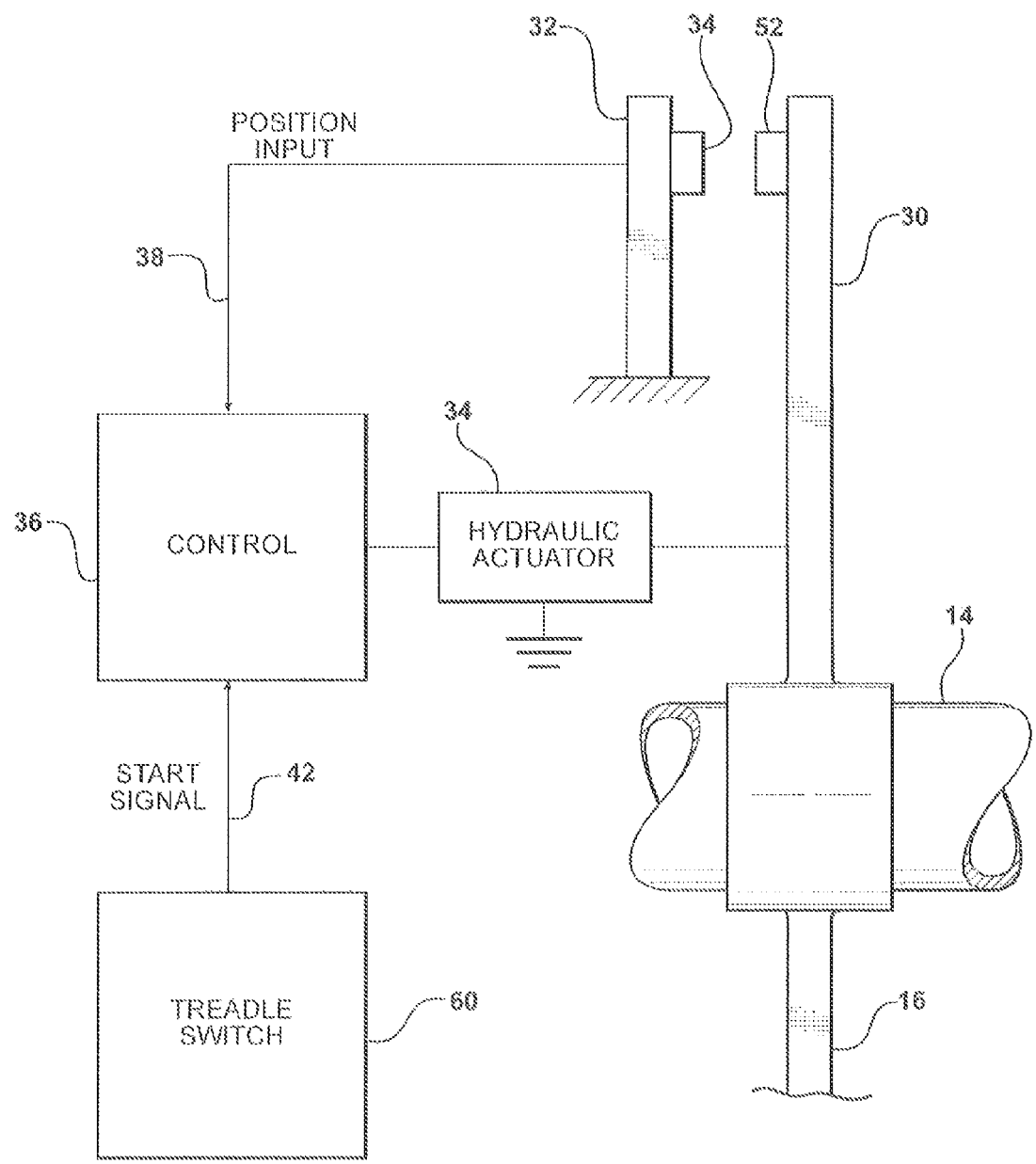

PENDULUM-TYPE WHEEL WASHER

FIELD OF THE INVENTION

This invention relates to vehicle wheel washers are more particularly to a wheel washer comprising a pair of pendulum-type elongate spray arms mounted in depending relationship from a common overhead pivotal mount so as to move in unison from an armed position to a fully displaced position thereby to follow the wheels of a vehicle passing between the spray arms.

BACKGROUND OF THE INVENTION

It is conventional for most automatic car wash systems to include some sort of wheel washer; i.e., a device which sprays a cleaning fluid onto the wheels of a passing vehicle moving along a car wash path of travel defined, for example, by a car wash conveyor. Most wheel washers are stationary devices, a factor which limits the exposure of the passing vehicle wheels to the cleaning fluids. A wheel washer which moves with the vehicle a short distance is known. This device includes a small dolly and the power to move it is provided by the vehicle being washed. Installation is complex.

SUMMARY OF THE INVENTION

The present invention provides an improved vehicle wheel washer of the fluid spray type which is easily installed and is designed to follow the wheels of a vehicle moving on a conveyor for a considerable distance, thus increasing the effectiveness of the wheel washing process. Moreover, this wheel washer is powered, in part, by gravity and requires no excavation or modification of the conveyor area.

In general, the invention comprises one or more elongate spray arms dependingly mounted from an overhead support for pendulum-type; i.e., swinging displacement about a horizontal axis. One or more spray heads are mounted at the lower ends of the depending arms and aimed inwardly to project cleaning and/or rinsing fluids toward the wheels of a passing vehicle. The spray heads follow the wheels by swinging about an overhead axis.

As hereinafter described, an illustrative embodiment of the invention, an opposed pair of arms move, in part, under the influence of gravity. An actuator such as a bi-directional hydraulic cylinder, moves the arms in unison to a non-vertical "armed" position in anticipation of the arrival of a vehicle whose wheels are to be cleaned. When the vehicle arrives at the cleaning station, a signal from a suitable switch such as a treadle, wand or other source is used to release the actuator such that the arms swing under the force of gravity toward a more vertical position thus following the vehicle wheels. As the arms reach the vertical position, the actuator is activated to continue the angular translation of the spray arms toward a third, non-vertical position which is essentially opposite the armed position. From this third position, the arms can be released back to the vertical position and rearmed for the approach of the rear wheels of the vehicle or the front wheels of a second vehicle in a procession of vehicles passing along the car wash conveyor.

While the invention is described with reference to a system having two mirror image spray arms, it can, of course, be carried out using a single spray arm which washes only the wheels on one side of the vehicle where space limitations so demand.

Various other features and advantages of an illustrative embodiment of the invention will be best understood by reference to the following written description which is to he taken in combination with the figures of the accompanying drawing.

BRIEF DESCRIPTION OF THE DRAWINGS

The description herein makes reference to the accompanying drawings wherein like reference numerals refer to like parts throughout the several views, and wherein:

FIGS. 4, 5 and 6 show positions of the actuator in three different phases of operation; and FIG. 7 is a diagrammatic view of the position sensor and control system.

DETAILED DESCRIPTION OF AN ILLUSTRATIVE EMBODIMENT

Figure 1:
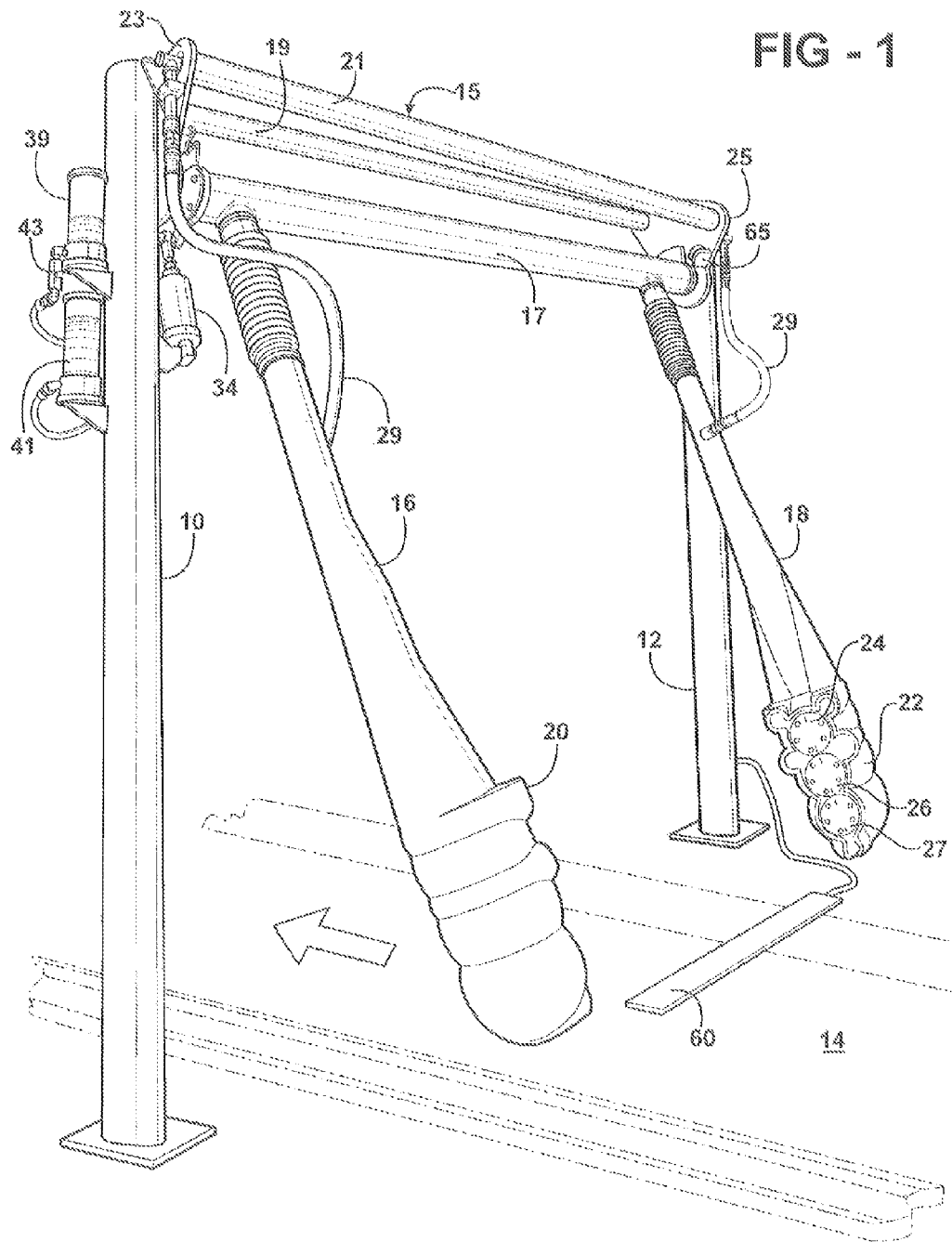
FIG. 1 is a perspective view of a wheel washing system constructed and arranged in accordance with the present invention with the elongate pendulum-type wheel washers mounted in mirror image relationship on opposite sides of a car wash conveyor path.

FIG. 1 shows a wheel washer system to comprise upright supports 10, 12 mounted on opposite sides of a car wash conveyor lane 14 where vehicles move in the direction shown by the arrow. Supports 10, 12 are joined at the upper ends by a fixed bridge structure 15 comprising end plates 23 and 25 connected by tubular cross braces 19 and 21. A tubular pivot beam 17 is mounted to and between the plates 23, 25 by low friction bearings and carries in spaced-apart depending relationship a pair of spray arms 16, 18 having decorative outer plastic housings 20 and 22 as shown. Each housing 20, 22 contains a group of spray heads 24, 26 and 27 which are supplied by hoses 29 with appropriate fluids to create inwardly-directed sprays at the wheels of a vehicle (not shown) passing along path 14.

Figure 2:
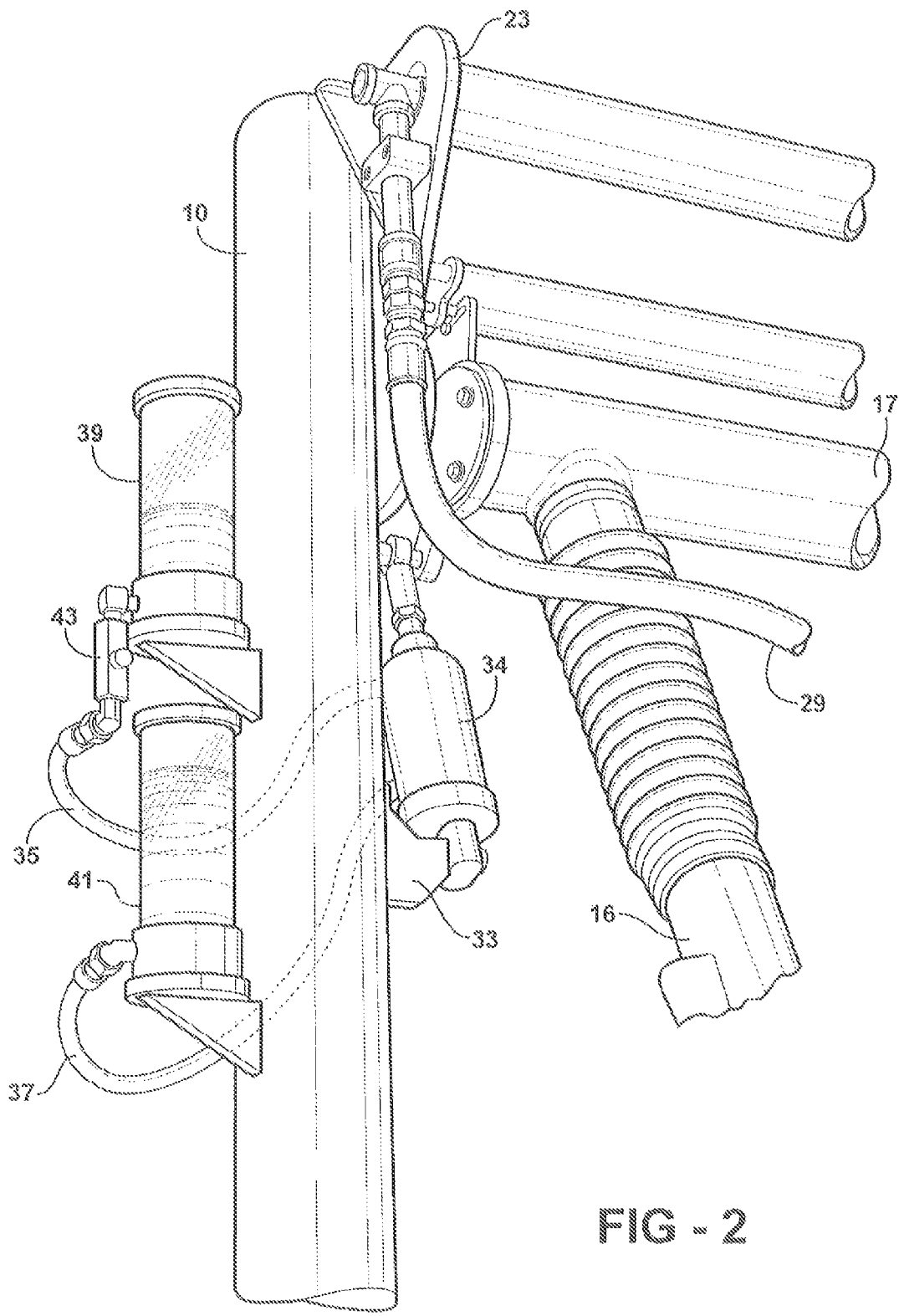
FIG. 2 is a perspective view of a portion of the FIG. 1 systems showing details of the hydraulic actuator.
Figure 3:
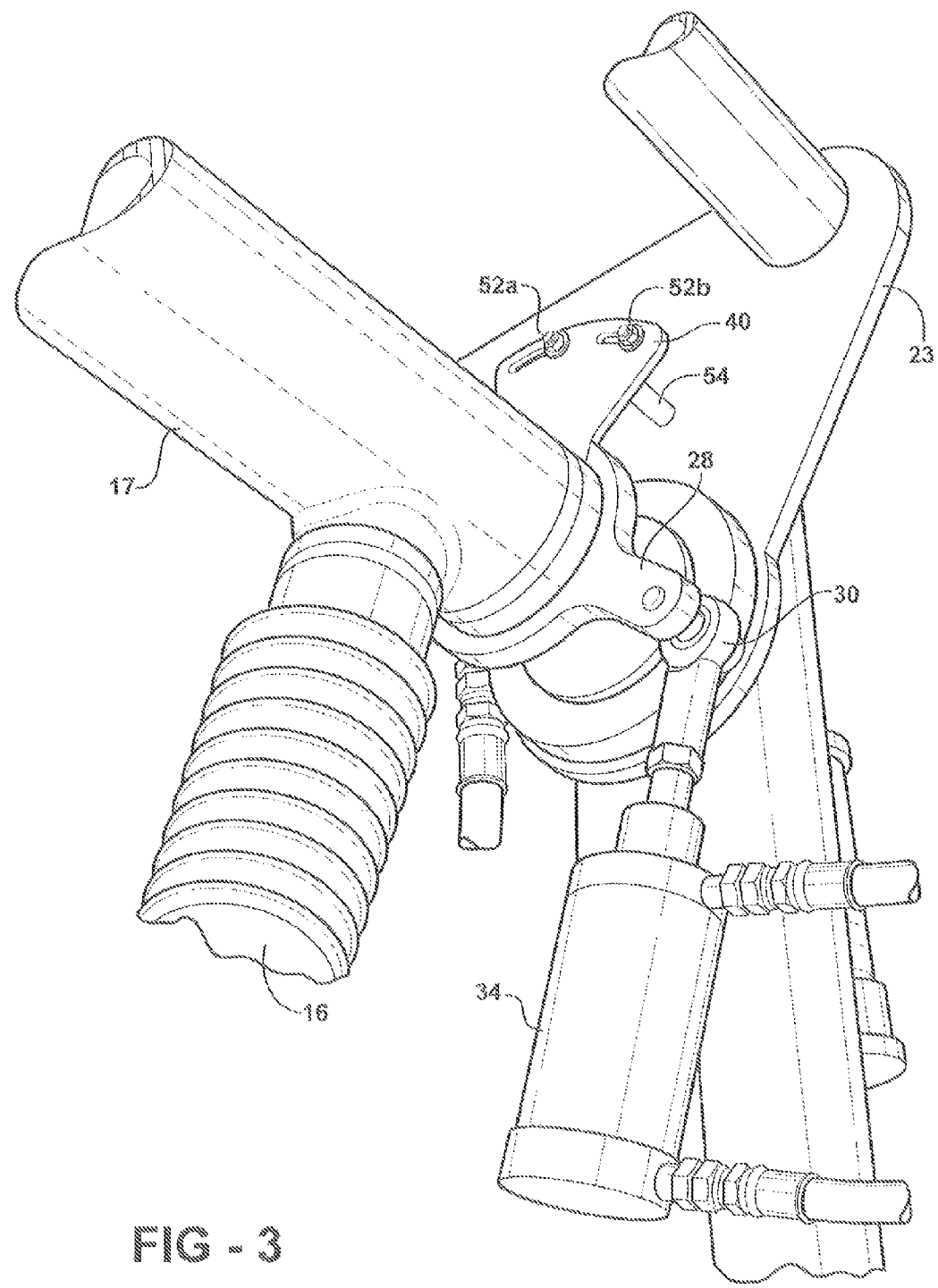
FIG. 3 is another perspective view of the actuator portion of the FIG. 1 system.

A crank arm 28 connected to rotate with pivot tube 17 receives the output fitting 30 of an hydraulic actuator 34 as shown in FIGS. 2 and 3. Actuator 34 is pivotally "grounded" to upright 10 by bracket 33 shown best in FIG. 2. Actuator 34 is bidirectional; i.e., can both push and pull on the crank arm 28. This is achieved by two hydraulic fluid supply lines 35 and 37 connected to fluid reservoir/pump units 39 and 41, respectively, mounted on upright 10. Valve 43 has three positions, two of which correspond with power-applying conditions. Valve 43 also provides a "free flow" or unpowered condition wherein the spray arms 16 and 18 are allowed to swing freely. In this condition the hydraulic fluid flows from one reservoir to the other and provides a dampening action for speed control purposes.

An angular position sensor is provided by a fan-shaped plate 40 attached to the crank arm 28 to rotate with it and with the pivot beam 17. Two adjustable ferrite buttons 52a and 52b are mounted on plate 40 to excite an inductive proximity sensor 54 on fixed end plate 23 as shown in FIG. 3. The proximity sensor 54 provides signals to a controller 36 via data line 38 as shown in FIG. 7.

A treadle switch 60 is placed in the path 14 ahead of the wheel washer to signal the approach of a vehicle (not shown) and provide a "start" signal to controller 36. A similar signal can come from a variety of other sources including the system controller itself. The controller 36 controls the valves 43 and pumps which control the hydraulic actuator 34 as diagrammatically shown in FIG. 7.

The operation of the system will now be described with particular reference to FIGS. 4-6.

Before a vehicle arrives at the wheel washer station, the system is "armed" by causing the actuator 34 to "raise" the arms 16, 18 to the position shown in FIGS. 1 and 4 and hold them in this position. In this position, the arms 16, 18 and the spray heads carried in them are swung in the direction of the approaching vehicle. This movement has the effect of lifting the arms and storing potential energy which, when released, moves the arms 16, 18 back toward the vertical position by gravity. The "release" function is triggered by the vehicle wheel running over the treadle 60. The valve 43 of the actuator 34 then opens the hydraulic actuator fluid paths to allow free flow. Gravity pulls the arms 16, 18 toward the vertical position as shown in FIG. 5. In this angular position of plate 40, one of the ferrite buttons 52 is directly opposite the sensor 54 on plate 23 and a signal is sent to controller to activate actuator 34 to continue to swing the arms 16, 18 at a controlled speed to continue to follow the vehicle wheels as they move between and beyond the uprights 10, 12. Once the arms 16, 18 reach the full-displacement position shown in FIG. 6, the proximity type angular position sensor again provides a position input to controller 36 to reverse the actuator 34 and return the arms 16, 18 at full speed to the "armed" position of FIG. 1 in readiness for the rear wheels of the vehicle. This cycle repeats for the following vehicles.

The swinging movement of arms 16, 18 from the armed position of FIG. 4 to the full displacement position of FIG. 6 occurs at a controlled rate which is matched to the conveyor speed thereby to follow the wheels of the vehicle; i.e., not get ahead of them or fall behind. Bumpers 65 on plate 25 act as limit stops for the arms 16 and 18.

The spray heads 24, 26 and 27 on the arms 16, 18 are supplied with suitable fluids such as cleaning chemicals and rinse water by way of the supply lines 29 shown. Again, it will he apparent to those skilled in the art that suitable fluid reservoirs, pumps and valves are to be provided in association with the supply lines to provide the appropriate fluids under the appropriate pressures to the spray heads 24, 26 and 27 at appropriate times. Conservation of water and other chemicals suggest that the spray heads 24, 26 and 27 be turned on and off on a demand basis.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. For example, the pivot beam 17 may be mounted between structural walls by means of brackets. A wand or optical sensor or other vehicle approach signal source may take the place of the treadle switch 60. More or fewer spray heads may be used.

What is claimed is:

1. A device for spray-washing the wheels of a vehicle moving along a wash lane comprising:
    an elongate arm having at least one laterally directed spray head mounted thereon proximate one end thereof;
    a pivotal mount defining a pivot axis proximate the other end of the arm to suspend the arm for pendulum movement between a rest position, an armed position in which the arm is angled in a first vehicle-approaching direction, and a third position in which the arm is angled in a vehicle-departing direction wherein the rest position is between the first and third position, said pendulum movement being such as to allow angular displacement of said head substantially parallel to said lane thereto to follow a wheel of a vehicle moving in said lane, and wherein the arm is substantially vertical in the rest position;
    an actuator for angularly displacing the arm about the pivot axis from the rest position to the armed position and to the third position; and
    a switch connected to release the arm from the armed position for unpowered movement toward the rest position.

2. The device defined in claim 1 wherein the actuator is bi-directional, the device further including a sensor to sense displacement of said arm from said armed position to said rest position and to provide a signal to a controller which causes the actuator to continue to displace the arm to the third, non-vertical position opposite the armed position, the displacement of the spray head during displacement of said arm from the armed position to the third position being such as to substantially follow the linear translation of a vehicle wheel along said lane.

3. A device as defined in claim 1 wherein the actuator is hydraulic.

4. A device as defined in claim 1 wherein the switch is a treadle which the wheel of a moving vehicle runs over to activate.

5. A device as defined in claim 2 wherein the sensor is of the proximity sensing type.

6. A device as defined in claim 1 further including mechanical stop means for preventing angular displacement of the arm beyond the armed and third positions.

* * * * *